United States Patent
Spitsberg et al.

(10) Patent No.: US 6,306,524 B1
(45) Date of Patent: Oct. 23, 2001

(54) DIFFUSION BARRIER LAYER

(75) Inventors: Irene T. Spitsberg, Loveland; Ramgopal Darolia, West Chester, both of OH (US); Melvin R. Jackson; Ji-Cheng Zhao, both of Niskayuna, NY (US); Jon C. Schaeffer, Greenville, SC (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/275,096

(22) Filed: Mar. 24, 1999

(51) Int. Cl.$^7$ .............................. B32B 15/00; B32B 15/20
(52) U.S. Cl. ................... 428/621; 428/632; 428/651; 428/652; 428/654; 428/670; 428/680
(58) Field of Search ................... 428/615, 621, 428/632, 651, 652, 654, 668, 670, 680, 681

(56) References Cited

U.S. PATENT DOCUMENTS 5,316,866 * 5/1994 Goldman et al. ................... 428/621
5,455,119 * 10/1995 Taylor et al. ........................ 428/632
5,756,223 5/1998 Cameron et al. ................... 428/688

\* cited by examiner

Primary Examiner—Deborah Jones
Assistant Examiner—Bryant Young
(74) Attorney, Agent, or Firm—Andrew C. Hess; David L. Narcisco

(57) ABSTRACT

A coating for use on a superalloy substrate comprising a diffusion barrier as an intermediate layer overlying the substrate and underlying a protective coating having a high aluminum content. The diffusion barrier layer is characterized by having low solubility for aluminum from either the substrate or the protective coating. Further, the diffusion barrier layer has low interdiffusivity for elements from the substrate and the coating, a minimal impact on the mechanical properties of the article which is coated, a minimal thermal expansion mismatch with both the substrate and the high aluminum content protective coating, and can be applied readily using existing coating application techniques. The diffusion barrier is preferably a single phase alloy or intermetallic compound.

57 Claims, 2 Drawing Sheets

DIFFUSION BARRIER LAYER

BACKGROUND OF THE INVENTION

1. Field of the Invention

This invention relates to gas turbine engines, and more particularly, to a diffusion barrier layer applied to airfoils in the turbine portion of a gas turbine engine.

2. Discussion of the Prior Art

The current coatings used on airfoils exposed to the hot gases of combustion in gas turbine engines for both environmental protection and as bond coats in thermal barrier coating (TBC) systems include both diffusion aluminides and MCrAlY (X) coatings. These coatings are applied over substrate materials, typically nickel-based superalloys, to provide protection against oxidation and corrosion attack. These coatings are formed on the substrate in a number of different ways. For example, a nickel aluminide, NiAl, may be grown as an outer coat on a nickel based superalloy by simply exposing the substrate to an aluminum rich environment at elevated temperatures. The aluminum diffuses into the substrate and combines with the nickel to form a coating of NiAl on the outer surface. A platinum-containing nickel aluminide (Pt—NiAl) coating can be formed by electroplating platinum over the nickel-base substrate to a predetermined thickness. Exposure of the platinum-coated substrate to an aluminum-rich environment at elevated temperatures causes the growth of an outer layer of Pt—NiAl as the aluminum diffuses into and reacts with the platinum and the underlying substrate. At the same time, Ni diffuses outward from the substrate. Depending on the Al content of the gas phase, as the aluminum diffuses toward the substrate and the Ni diffuses away from the substrate and into the coating, $PtAl_x$ phases may precipitate so that the Pt—NiAl intermetallic may also contain precipitates of $PtAl_x$ intermetallic, where x is 2 or 3.

Of course, an MCrAlY where M is an element selected from the group consisting of Ni, Fe and Co and combinations thereof may be applied to the substrate as a bond coat or as an environmental coating by any known technique. When applied as bond coats in thermal barrier systems, an additional thermally resistant ceramic coating such as yttria-stabilized zirconia (YSZ) is applied over top of the coating. As the airfoils are exposed to the hot, oxidative, corrosive environment of a gas turbine engine, a number of metallurgical processes modify the airfoils. Initially, the aluminum rich bond coat forms a highly adherent alumina ($Al_2O_3$) layer which grows under the ceramic coating. However, with further high temperature engine service, spallation of the YSZ topcoat occurs at either the bond coat/alumina interface or at the alumina/YSZ interface. The strength of these interfaces, the stresses in the interface plane, and their changes with temperature exposure can influence the TBC coating system life.

There are many factors related to chemistry and microstructure of both the alloy substrate and bond coat that affect strength of the critical interfaces and growth of the alumina scale and consequently the alumina scale adhesion. The factors will vary depending on the substrate/coating system. These factors include interdiffusion processes which change the chemistry of the coating and the substrate and the chemistry of the oxide scale. Changes related to these interdiffusion processes affect not only coating chemistry, but microstructure, creep resistance, fracture toughness, phase composition and other coating properties, as well as growth of the alumina scale.

Essentially, there is a tendency for aluminum (Al) from the aluminum-rich aluminide outer layer to migrate inward toward the substrate, while traditional alloying elements present in the superalloy, Co, Cr, W, Re, Ta, Mo, and Ti migrate from the substrate into the coating as a result of composition gradients between the underlying superalloy and the coating. Extensive interdiffusion occurs between the coating and the alloy as a result of high temperature exposure. Aluminum diffusion toward the substrate reduces the concentration of Al in the outer layer, thereby reducing the ability of the outer layer to regenerate the highly protective and adherent alumina scale. Simultaneously, the migration of Co, W, Re, Ta, Mo, and Ti likely degrades the protective properties of the alumina. Another result of diffusion of aluminum is the formation of a diffusion layer or zone into the airfoil wall which essentially means undesirable consumption of the airfoil wall.

One solution to the problem of growth of the diffusion layers on metal substrates used in the glass manufacturing industry is set forth in U.S. Pat. No. 5,756,223 ('223).

In order to prevent oxidation of substrate materials, a ceramic interlayer is interposed over the substrate. The ceramic interlayer then is overcoated with a layer of palladium or platinum or a combination of the two. The purpose of the interlayer is to prevent the oxidation of the substrate by inhibiting the migration of oxygen through the precious metal coating to the substrate. The ceramic interlayer acts as a getter for oxygen. While this is effective for the glass industry in prevention of oxidation of the substrate, it is not effective for a gas turbine surface, because substrate oxidation is not a problem, and a ceramic interlayer such as described in the '223 patent is not effective in prevention of coating deterioration in gas turbine service, the solution for the glass industry does not address the complex and extensive diffusion processes occurring between superalloys and their aluminum containing coatings.

What is needed is a diffusion barrier between the coating and the substrate alloy that prolongs coating life by extending the time the coating chemistry provides a protective and adherent alumina scale, while being essentially chemically compatible with the bond coat and the superalloy, thermodynamically or kinetically stable and highly adherent to both the substrate alloy and the bond coat. In addition, the diffusion barrier should have low solubility and interdiffusivity for Al and elements from the substrate, minimal coefficient of thermal expansion (CTE) mismatch with the underlying substrate and the overlying protective coating, high stability at service temperatures, and ease of deposition preferably using currently available application techniques such as plasma spray, physical vapor deposition processes such as sputtering or other such methods. Oxide ceramics in which the diffusion rate of aluminum is low are likely candidates for diffusion barriers. These ceramic materials typically exhibit adherence problems. Thickness of such diffusion barriers typically are limited to a few microns, which may not be sufficient to act as effective diffusion barriers for a prolonged time at elevated temperature exposure.

BRIEF SUMMARY OF THE INVENTION

The present invention is directed toward a diffusion barrier layer for use as an intermediate layer between a nickel-base superalloy substrate and in its broadest embodiment, an outer aluminum-containing layer. The material for the diffusion layer is selected from the categories of alloys and intermetallics which are thermodynamically stable and have no or low solubility for aluminum. As their "barrier" characteristics are based on the solubility (or lack thereof) of aluminum and thermal stability, they can be called thermodynamic diffusion barriers.

An advantage of the present invention is that it slows down the growth of a diffusion layer from an outer aluminum-containing layer into a nickel-base substrate material. Thus, the airfoil maintains a substantial portion of its wall thickness, therefore during repair, lesser removal of diffusion layer is required. This in turn means that the airfoil can undergo more repair cycles.

Another advantage of the system of the present invention is that the diffusion barrier layer prevents the loss of aluminum, which is a critical scale-forming element, by inhibiting the inward migration of aluminum from the aluminide coating to the lower-aluminum containing substrate so that the oxidation and corrosion resistance of the coating is maintained when the coating is used as an environmental coating and the adherence of the ceramic top coat is maintained when the coating is used as a bond coat leading to longer mean life between repairs. The diffusion barrier may also advantageously retard or prevent the outward migration of one or more elements such as Co, Cr, W, Re, Ta, Mo and Ti from the substrate to the coating during high temperature operation. It is believed that these elements contribute to the deterioration of the protective properties of the alumina scale.

The present invention provides for an article for use in a high temperature oxidative environment comprising a nickel base superalloy substrate. Overlying the nickel base superalloy substrate is a tightly adherent layer that acts as a diffusion barrier. The diffusion barrier layer is an intermediate coating between the substrate and an outer coating having a high concentration of aluminum. Typically, the outer coating is a MCrAlY(X) or an aluminide of nickel optionally containing platinum. The thermodynamic diffusion barrier layer ideally is a solid solution or intermetallic alloy having a high thermodynamic stability and a low diffusion permeability and solubility for Al from the coating and ideally for refractory elements such as W, Ta, Mo, Re and other elements such as Ti and Co. It is also chemically compatible with both the superalloy substrate and the bond coat. Because the layer is also thermodynamically stable, phase transformations occur very slowly or do not occur at all, since such phase transformations may affect its diffusion barrier properties. Finally, the diffusion barrier layer is sufficiently bonded to both the aluminide coating and the superalloy so that thermal cycling will not result in spallation due to cyclic fatigue. This also can be accomplished by having a coefficient of thermal expansion similar to that of the aluminide coating and the superalloy coating so that stresses resulting from differences in coefficients of thermal expansion are low.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE PREFERRED EMBODIMENTS

Figure 1:
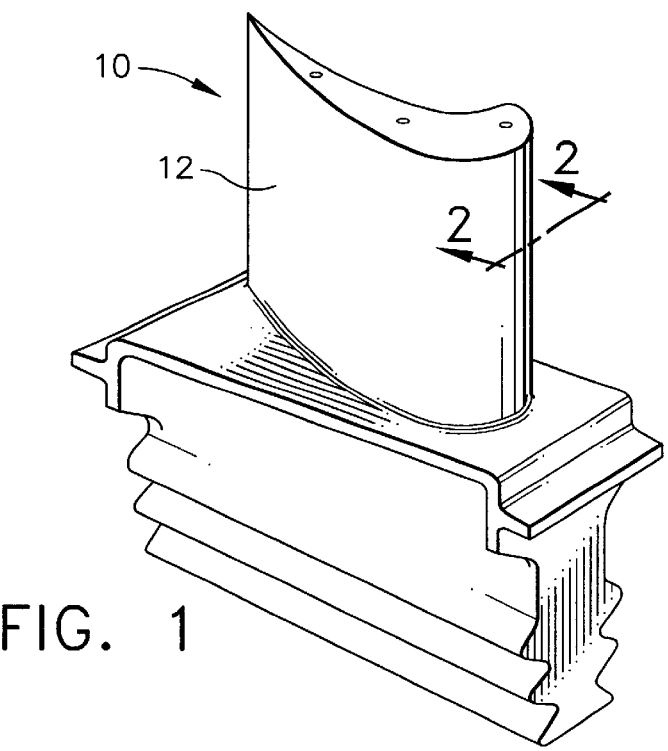
FIG. 1 is a perspective of a turbine airfoil.
Figure 2:
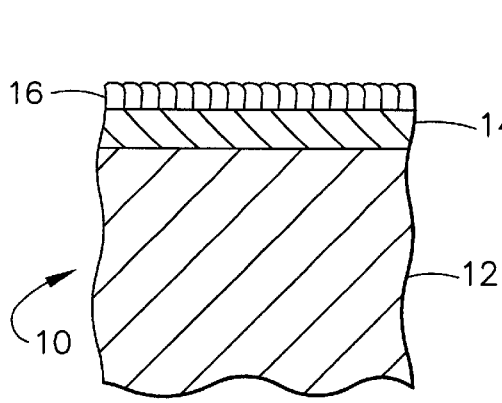
FIG. 2 is a cross-sectional view of a prior art airfoil having an outermost thermal barrier layer after manufacture and prior to being place into service.

The present invention provides an improved airfoil for use in a high temperature oxidative and corrosive environment such as is found in the turbine portion of a gas turbine engine. Typically, these airfoils are blades and vanes, and are comprised of a nickel-based superalloy substrate and a coating or coatings to impart improved environmental protection or improved high temperature capabilities to the airfoil. When environmental protection is required, a coating such as a MCrAlY(X), where M is an element selected from the group consisting of Ni, Fe and Co and combinations thereof and (X) is an element selected from the group consisting of Ta, Re, Ru, Pt, Si, B, C, Hf and Zr and combinations thereof, is applied directly over the substrate. Alternatively, an aluminide of Ni with or without Pt is applied over the substrate. When high temperature capabilities are required a thermal barrier layer is applied over the aluminide or MCrAlY(X) which serves as a bond coat between the thermal barrier layer and the substrate. Typically, this thermal barrier layer is a ceramic oxide such as yttria-stabilized zirconia (YSZ). FIG. 1 is a perspective of a typical airfoil such as a turbine blade. A cross-section of a prior art turbine blade 10 prior to being placed in service, having such a thermal barrier layer is shown in FIG. 2, in which the nickel based superalloy substrate 12 is overlaid with a nickel aluminide bond coat. Overlying the nickel aluminide is a topcoat of yttria stabilized zirconia (YSZ) such as 93 wt % zirconia stabilized with about 7 wt % yttria (7YSZ). A typical single crystal nickel-based superalloy substrate is Rene N5, having a nominal composition by weight of 7.5% Co, 7.5% Cr, 6.2% Al, 6.2% Ta, 5% W, 3% Re, 1.5% Mo, 0.15% Hf, 0.05% C, 40 ppm B, 20–300 ppm Y and the balance Ni and incidental impurities.

Figure 3:
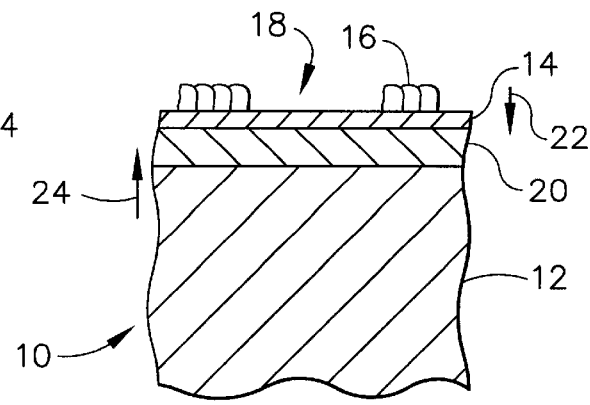
FIG. 3 is a cross-sectional view of a prior art airfoil after being placed into service and just prior to its removal from service, the directional arrows showing the inward and outward diffusion of elements during service.

FIG. 3 is a cross-sectional view of the prior art airfoil of FIG. 1 after service in a gas turbine engine just prior to its removal. The ceramic topcoat 16 of YSZ exhibits some spallation 18, indicated by the voids, as YSZ peels away from bond coat 14. The peeling occurs because bond coat 14 no longer has the same composition as when it was first formed. Below bond coat 14 is a diffusion layer 20 that is formed as aluminum from the high aluminum content bond coat 14 diffuses inwardly toward the lower aluminum content superalloy substrate as indicated by arrow 22, leaving the bond coat depleted of aluminum, which of course is a necessary element for the tightly adherent alumina scale. At the same time, although at different rates, Co, W, Re, Ta, and Mo diffuse outwardly as indicated by arrow 24 from the substrate through the diffusion zone into the coating, further degrading the properties of the alumina scale formed at the bond coat/ceramic interface and contributing to the deterioration of the bond capabilities of the coating, causing the spallation of the ceramic top coat.

Figure 4:
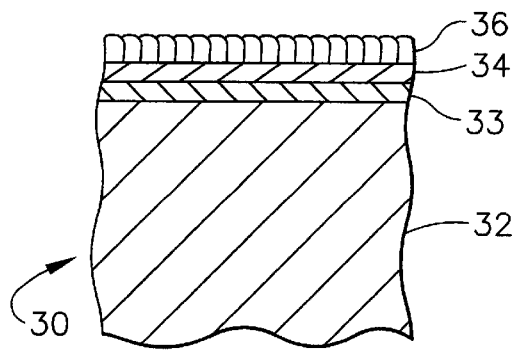
FIG. 4 is a cross-sectional view of an airfoil of the present invention having an outermost thermal barrier layer after manufacture and prior to being place into service.
Figure 5:
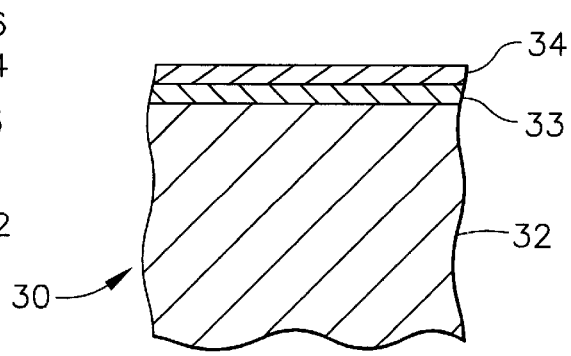
FIG. 5 is a cross-sectional view of an airfoil of the present invention in which the outermost layer forms a protective environmental layer, after manufacture and prior to being place into service.
Figure 6A:
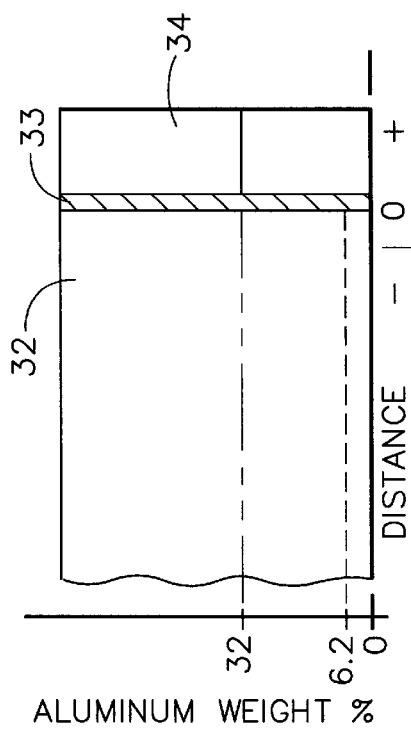
FIG. 6 are graphs indicative of test samples made in accordance with the present invention after testing depicting the effect of a diffusion barrier on wall thickness as a function of concentration of Al at distances from the original substrate/coating interface.
Figure 6C:
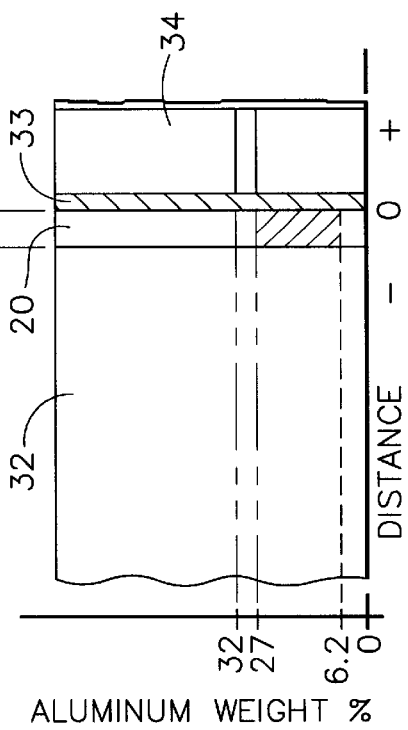
Figure 6B:
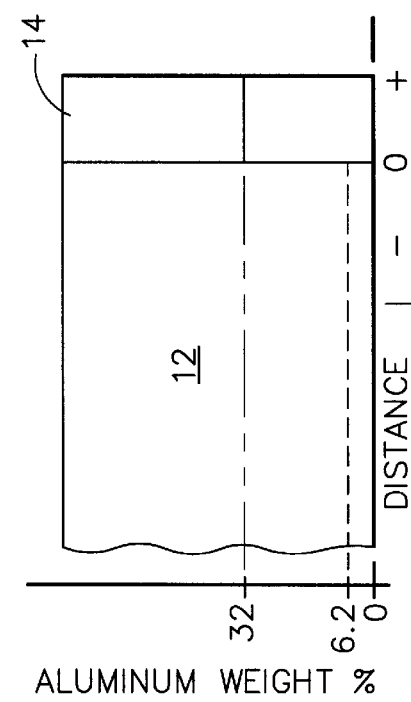
Figure 6D:
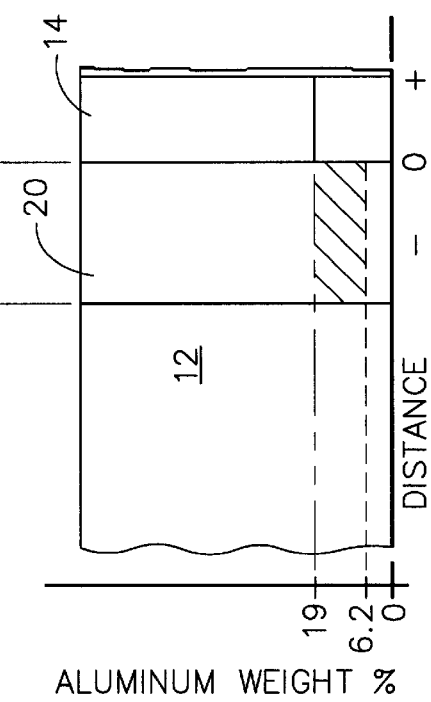

The present invention as set forth in FIG. 4 provides for an airfoil 30 for use in a turbine section of a gas turbine engine comprised of a superalloy substrate 32. Although the substrate airfoil may be any superalloy, including cobalt-based superalloys, Ni-based superalloys and Fe-based superalloys, preferred compositions include Rene N5, Rene 80, Rene 142 and Rene N6, four well-known airfoil alloys. Overlying the superalloy substrate is a tightly adherent diffusion barrier layer 33. Overlying the diffusion barrier layer 33 is a coating 34 having a high concentration of aluminum. Typical coatings include MCrAlY(X) coatings and diffusion aluminides of nickel. These coatings 34 may be used as environmental coatings or as bond coats. When used as bond coats, a ceramic topcoat 36, typically 7YSZ, is applied as a thermal barrier coating to allow performance at even higher temperatures, as shown in FIG. 4. When used as an environmental coat, as shown in FIG. 5, the MCrAlY(X) coatings and/or the aluminides form the outermost surface of the airfoil.

The diffusion barrier layer 33 of the present invention should have low diffusion permeability for aluminum from the coating and preferably for refractory elements from the substrate as well. In reality, some diffusion of Al will occur across layer 33 leading to a slow phase transformation that can ultimately destroy the layer and thus accelerate diffusion between the substrate 32 and coating 34. Because of this, the composition of layer 33 should be stabilized with elements that decrease standard Gibbs-free energy of the diffusion barrier layer and which slow the diffusion of elements responsible for phase transformations so that the kinetics of the phase transformation will be as slow as possible. Unless otherwise specified below, the composition of the diffusion barrier layer will be given in atomic percent, "a/o".

The diffusion barrier layer 33 of the present invention ideally should function as more than just a diffusion barrier to slow or prevent the diffusion of certain atomic species across and through it, although this effect on diffusion of Al in the coating 34 is its primary function. It also is desirable that the diffusion barrier also retard or prevent the diffusion of refractory elements from the substrate 32 into the aluminide coating. In addition, this diffusion barrier layer 33 must be essentially chemically compatible with both the aluminum-rich coating 34 and the superalloy substrate 32. Specifically, no low melting phases or other deleterious phases must result from chemical interactions at high temperatures. The diffusion barrier layer 33 must also be thermodynamically stable so that phase transformations occur very slowly, if at all. The diffusion barrier layer 33 should be sufficiently bonded to both coating 34 and to superalloy substrate 32 so as not to cause spallation during thermal cycling. The diffusion barrier layer 33 should have a coefficient of thermal expansion close to the coefficient of thermal expansions of both aluminide coating 34 and substrate 32. It must also have sufficient strength at interfaces with the aluminide coating and with the substrate so that stresses resulting from thermal cycling will not cause fatigue failures.

Several alloy compositions satisfy at least some of the conditions for forming a diffusion barrier layer. The composition of these alloys are given as Table 1.

TABLE 1

Alloy Compositions (in atomic percent)

| ALLOY | Ni | Co | Al | Ta | Ru | Cr | W | Re | Other |
|---|---|---|---|---|---|---|---|---|---|
| DB1 | 45 |  | 25 | 25 |  | 5 |  |  |  |
| DB2 | 45 |  | 25 |  |  | 5 |  |  | 25Nb |
| DB3 |  | 45 | 25 | 25 |  | 5 |  |  |  |
| DB4 | 45 |  | 25 |  |  | 5 |  |  | 25Hf |
| DB5 |  |  | 50 |  | 50 |  |  |  |  |
| DB6 |  |  |  |  | 50 |  |  |  | 50Zr |
| DB7 |  |  |  |  | 50 |  |  |  | 50Hf |
| DB8 | 72 |  | 1 | 24 |  | 3 |  |  |  |
| DB9 |  | 72 | 1 | 24 |  | 3 |  |  |  |
| DB10 | 72 |  | 1 |  |  | 3 |  |  | 24Nb |
| DB11 |  |  | 1 | 24 |  | 3 |  |  | 72Pt |
| DB12 |  |  |  | 33 |  | 67 |  |  |  |
| DB13 | 80 |  |  |  |  |  | 20 |  |  |
| DB14 |  | 75 |  |  |  |  | 25 |  |  |
| DB15 | 76 |  | 15 | 9 |  |  |  |  |  |
| DB16 | 76 |  | 15 | 9 |  |  |  |  | 500 ppmB |
| DB17 | 74 |  | 20 |  |  |  | 6 |  |  |
| DB18 | 70 |  | 13 |  |  |  |  |  | 17Y |
| DB19 |  | 65 |  |  | 30 | 5 |  |  |  |
| DB20 | 80 |  |  |  | 20 |  |  |  |  |
| DB21 | 20 |  |  |  | 80 |  |  |  |  |
| DB22 |  |  |  |  | 15 | 85 |  |  |  |
| DB23 | 22 | 17 |  | 1 |  | 5 | 15 | 35 | 5Mo |
| DB24 |  |  |  |  |  |  |  | 100 |  |
| DB25 | 80 |  |  |  |  |  |  | 20 |  |
| DB26 |  |  |  |  |  | 65 |  | 35 |  |
| DB27 |  | 50 |  |  |  |  |  | 50 |  |
| DB28 |  |  |  |  |  |  |  | 60 | 40Pt |

One class of alloys tested were simple metallic solid solution alloys containing Ru with melting temperatures well above that of Ni-based superalloy substrates. These high melting point materials have relatively low diffusion rates for Al. Alloys representative of this type include DB19-22 in Table 1. Each of these single phase solid solution alloys should dissolve some Al from a NiAl layer 34. However, because of their increased melting temperatures, the diffusivity of Al is lowered.

Alloys in which Ru is not the predominant element including at least about 10 a/o of Ru are thus expected to form an excellent diffusion barrier between a nickel-based substrate and an aluminum-containing outer layer. In preferred embodiments, such solid solution diffusion barriers should include Ru up to about 20 a/o. Solid solutions in which Ru does predominate include about 80 a/o Ru and higher. At about 20 a/o Ru, the solubility limit of Ru in the fcc Ni lattice is approached. At about 80% Ru, a hexagonal structure of Ru and Ni is stabilized. A hexagonal structure is also established in Co-Ru-Cr alloys in the range of 15–35 a/o Ru, up to about 10% Cr and the balance Co and incidental impurities, and preferably at about 30 a/o Ru and 5 a/o Cr with the balance Co. In the compositional range of between about 20 a/o Ru and about 80 a/o Ru, two-phase mixtures of solid solution alloys may be formed. These are expected to also serve as diffusion barriers. The remaining elements in the preferred embodiments are selected from the group consisting of Ni, Co, Cr and combinations thereof. Ru may be added to a bcc-Cr matrix in the amount of 10–20 a/o to yield a stable diffusion barrier layer. Small amounts of other elements may be included in the alloy in amounts that do not affect the characteristics and the performance of the alloy as a diffusion barrier that adheres tightly to the underlying substrate.

These Ru-containing solid solution alloys are excellent in preventing the inward migration of aluminum from the outer layer, while at the same time inhibiting the outward migration from the substrate of alloying elements such as Co, Cr, W, Ta, Ti, Mo and other alloying elements included in superalloy substrates. The thickness of the layer may vary from about 5 to about 100 microns. Sufficient Ru must be present to raise the melting point of the alloy and inhibit diffusion. The diffusion barriers of the present invention are chemically compatible with superalloys and may be applied with well-known techniques such as thermal spraying, chemical vapor deposition or physical vapor deposition processes.

EXAMPLE 1

A sample was prepared as a control by coupling a 5/8"×9/16"×1/8" (Length×Width×Thickness) sample of Rene N5 to a similar sized sample of NiAl aluminide. No diffusion barrier layer was present. The Rene N5 sample had an original concentration of Al, in weight percent, of 6.2%, while the NiAl had an original concentration of 32% by weight. The sample was annealed for 100 hours at 2200° F. and aluminum measurements were made across the interface of the Rene N5 and NiAl using a microprobe. The aluminum content in the Rene N5 increased to about 9% by weight at the current Rene N5/NiAl interface. Several hundred additional microns of Rene N5 contained Al greater than 6.2% by weight as a result of interdiffusion. At the current Rene N5/NiAl interface, the concentration of Al in NiAl was about 19% by weight, and about 300 microns of Rene N5 was converted into NiAl (and TCP phases) as a result of the effects of diffusion from NiAl. The Al content in NiAl gradually increased from 19% to 32% by weight at about 900 microns from the current Rene N5/NiAl interface. The width of NiAl with less than 32% by weight Al was 900 microns and was thus established as the baseline of 100%.

EXAMPLE 2

A sample was prepared by sandwiching a wedge-shaped cast alloy having a 5/8"×9/16" (length (l) to width (w)) and having a thickness (t) varying from 0.02" at the thick end to 0.002 inches at the thin end between a 5/8"×9/16"×1/8" (l×w×t) sample of Rene N5 and a similar sized sample of NiAl aluminide. The composition of the metallic solid solution, DB19, was 5 a/o Cr, 30 a/o Ru and the balance Co and incidental impurities. DB19 was hexagonal at service temperatures, including sufficient Ru added to Co to stabilize the hexagonal crystal structure. This crystal structure further served to reduce diffusivity of Al compared to FCC structures. The N5 sample had an original concentration of Al, in weight percent, of 6.2%, while the NiAl had an original concentration of 32% by weight. The sample was annealed for 100 hours at about 2200° F., the standard annealing treatment, and aluminum measurements were made across the N5/DB19/NiAl interface using a microprobe. The percentage aluminum at the interface of the diffusion barrier and the NiAl was about 27% by weight and fell to near zero in the DB19 layer before reaching the substrate. The relative thickness loss due to aluminum diffusion from the NiAl for the sample using DB19 as a diffusion barrier layer was calculated to be 42% as compared to the baseline Example 1.

EXAMPLE 3

A sample was prepared by sandwiching a wedge-shaped cast metallic alloy having a 5/8"×9/16" (length to width) and having a thickness varying from 0.02" at the thick end to 0.002 inches at the thin end between a 5/8"×9/16"×1/8" (L×W× T) sample of Rene N5 and a similar sized sample of NiAl aluminide. The composition of the metallic solid solution, DB20, was in atomic percent, 20 a/o Ru and the balance Ni and incidental impurities, and is near the Ru solubility limits in the fcc Ni-lattice. The N5 sample had an original concentration of Al, in weight percent, of 6.2%, while the NiAl had an original concentration of 32% by weight. The sample was given the standard annealing treatment set forth in Examples 1 and 2 and aluminum measurements were made across the N5/DB20/NiAl interface using a microprobe. The percentage aluminum at the interface of the diffusion barrier and the NiAl was about 27% by weight and fell to near zero in the DB20 layer before reaching the substrate. The relative thickness loss due to aluminum diffusion from the NiAl for the sample using DB20 as a diffusion barrier was calculated to be 67–72% as compared to the baseline Example 1.

EXAMPLE 4

A sample was prepared by sandwiching a wedge-shaped cast metallic alloy having a 5/8"×9/16" (length to width) and having a thickness varying from 0.02" at the thick end to 0.002 inches at the thin end between a 5/8"×9/16"×1/8" (L×W× T) sample of Rene N5 and a similar sized sample of NiAl aluminide. The composition of the metallic solid solution, DB21, was in atomic percent 20 a/o Ni and the balance Ru and incidental impurities. DB21 is hexagonal at service temperatures, including sufficient Ru added to Ni to stabilize the hexagonal crystal structure. This crystal structure reduces diffusivity compared to fcc crystal structures. The N5 sample had an original concentration of Al, in weight percent, of 6.2%, while the NiAl had an original concentration of 32% by weight. The sample was given the standard annealing treatment and aluminum measurements were made across the N5/DB21/NiAl interface using a microprobe. The percentage aluminum at the interface of the diffusion barrier layer and the NiAl was about 26% by weight and fell to zero in the DB21 layer before reaching the substrate. The relative thickness loss due to aluminum diffusion from the NiAl for the sample using DB21 as a diffusion barrier was calculated to be 39–44% as compared to the baseline Example 1.

EXAMPLE 5

A sample was prepared by sandwiching a wedge-shaped cast metallic alloy having a 5/8"×9/16" (length to width) and having a thickness varying from 0.02" at the thick end to 0.002 inches at the thin end between a 5/8"×9/16"×1/8" (L×W× T) sample of Rene N5 and a similar sized sample of NiAl aluminide. The composition of the metallic solid solution, DB22, was in atomic percent 15 a/o Ru and the balance Cr and incidental impurities. DB22 is expected to have a BCC crystal structure of service temperatures. Because Cr has low solubility in NiAl, there was a low driving force for diffusion between DB22 and the NiAl. The N5 sample had an original concentration of Al, in weight percent, of 6.2%, while the NiAl had an original concentration of 32% by weight. The sample was given the standard annealing treatment and aluminum measurements were made across the N5/DB22/ NiAl interface using a microprobe. The percentage aluminum at the interface of the diffusion barrier and the NiAl was about 30% by weight and fell to zero in the DB22 layer before reaching the substrate. The relative thickness loss due to aluminum diffusion from the NiAl for the sample using DB22 as a diffusion barrier was calculated to be 11–17% as compared to the baseline Example 1.

Each of the samples utilizing diffusion barrier layers including Ru as set forth in the above examples retained high concentration of Al in the bond coat. In all of the examples, the tests were performed using the wedge-shaped sandwich structure described therein. While it is recognized that such sample specimens do not duplicate actual operational experience, they do provide a comparison of the effectiveness or non-effectiveness of different substrate/diffusion barrier layer/coating combinations and suggest the combinations that are likely to be effective under service conditions.

A second class of diffusion barrier layers utilizes additions of Ta, W and B as additions to the $Ni_3Al$ intermetallic compound to increase the thermodynamic stability of this structure and to lower the diffusion rate of nickel and Al in the $Ni_3Al$ structure. Ta and W additions also had the effect of increasing the melting temperature of the compounds while decreasing their thermal expansion coefficients. When Ta and W are added, they partially or completely substitute for Al in the $Ni_3Al$ structure. An additional advantage is that these elements have low solubilities in NiAl, so that there is very little driving force for the diffusion of these elements from their positions in the $Ni_3Al$ structure into the NiAl coating. A wide range of Ta, up to 35 a/o, can be added to the $Ni_3Al$ compound without causing second phase precipitation, while maintaining a lattice structure of the $L1_2$, type.

Boron (B), when added to the $Ni_3Al$ structure in small amounts, also affects the diffusion rate of aluminum and nickel across the diffusion barrier layer. However, the mechanism may be different from the mechanism of Ta and W additions. B is known to slow down grain boundary diffusion in $Ni_3Al$ by a few orders of magnitude and to eliminate grain boundary brittleness of the $Ni_3Al$ alloys. Thus, the addition of B in microalloying amounts, has a tendency to slow diffusion rates of Ni and Al, most probably by inhibiting diffusion of Al and Ni along grain boundaries, where diffusion rates tend to be four to five orders higher than across the bulk structure. Alloy compositions DB15, DB16 and DB17 from Table 1 are examples of diffusion barrier layers of this type. Ta concentrations of up to 35 a/o can be utilized, and W compositions of up to 10 a/o can be utilized. B may be present in amounts of from 200 to 700 PPM.

EXAMPLE 6

A sample was prepared by sandwiching a wedge-shaped cast alloy having the composition of alloy DB16 as set forth in Table 1. The methodology of the test was identical to the test set forth in Examples 1 through 4 above. After annealing, the aluminum measurements made at the N5/DB16/NiAl interface using a microprobe indicated that the percentage aluminum at the DB16/NiAl interface was about 20% by weight. The relative thickness loss due to aluminum diffusion from the NiAl for the sample using DB 16 as a diffusion barrier was calculated to be about 61% to 78%.

Another class of alloys satisfying the requirements for the diffusion barrier layer of the present invention is of the form $M_3X$, where M is predominantly Ni, Co or Pt, and X is Ta or Nb. The phases formed by these intermetallic compounds are non-cubic close-packed structures. These close-pack structures are expected to have good stability in contact with both the B2 structure of the NiAl coating and with the structure of the superalloy substrate. Ta and Nb both have low solubility in NiAl, so that diffusion of these elements into the NiAl coating is expected to be low. While some Al may diffuse from the NiAl coating into the diffusion barrier layer, such diffusion is expected to cause the formation of Huesler phases of the form $M_2AlX$ at the interface between the NiAl coating and the diffusion barrier layer. These phase transformations alter the original $M_3X$ structure. These Huesler phases are expected to reach equilibria with NiAl compositions having higher Al concentrations than occurs with NiAl-superalloy equilibrium. The presence of the Huesler phases should make formation of a gamma-beta ("γ-β") equilibrium more difficult. The diffusion of Al to form the Huesler phases will quickly bring the Al concentration of the NiAl coating into equilibrium at the interface with the diffusion barrier layer. At the interface of the diffusion barrier layer with the superalloy substrate, a X-rich γ' phase will form as X moves across the interface into the substrate. Additional phases such as topographically close packed (TCP) phases, may form as a result of increasing concentrations of substrate elements Cr, Mo, W, and Re occurs as Ni, Co, and Al in γ of the substrate are consumed in the formation of the γ'. Alloys DB8, DB9, DB10, and DB11 from Table 1 are alloys of this type. Variations of the Ta and the Nb of up to about 25 a/o are permissible as long as the $M_3Ta$ or $M_3Nb$ structure is stabilized. If insufficient Ta or Nb is present, then a $M_3Al$ structure predominates which is metastable and the driving force for conversion of this γ' structure to β predominates yielding an undesirable result.

Still another concept which satisfies the structure requirements for the diffusion barrier layer of the present invention utilizes alloys similar to the previous alloys. However, rather than starting with a $M_3X$ structure and allowing a natural phase transformation of the Huesler phases over time, the diffusion barrier layer in this class of alloys entails placing Huesler phases directly between the NiAl coating surface and the superalloy substrate. These $M_2AlX$ Huesler phases where M is selected from the group consisting of Ni and Co are expected to be in equilibrium with a NiAl coating having a higher Al aluminum concentration. The mutual solubilities of the NiAl and the Huesler phases are expected to be small so that good stability is expected between the coating and the diffusion barrier layer. At the interface of the Huesler phase with the superalloy substrate, there is still a strong tendency for interdiffusion because of the solubilities of Ta, Hf and Nb in the $Ni_3Al$ γ' phase of the substrate and the ability to transform γ of the substrate into γ' (X=Ta, Nb, or Hf) where X substitutes for Al in γ'. However, unlike the NiAl structure, which has a broad stoichiometric range to as low as 38 a/o aluminum, the Huesler phases have relatively tight stoichiometric ranges for both Al and X. Because of this difference, the interface between the diffusion barrier layer and the superalloy substrate should remain in a fairly stable condition, allowing the diffusion barrier layer to serve its function of maintaining high Al levels in the coating while preventing substrate elements from crossing the diffusion barrier layer and reaching the NiAl coating.

Another class of alloys that meet the requirements of a diffusion barrier layer are based on composition of RuX, where X is an element selected from the group consisting of Al, Zr or Hf and having a B2 structure identical to the intermetallic NiAl.

Unlike NiAl, RuAl has a very narrow stoichiometry. Thus, it will be able to diffuse along the chemical potential gradient toward the superalloy substrate by dissolution, rather than by rapid Al diffusion. Similarly, at the other interface it will dissolve into NiAl while maintaining the high-Al stoichiometry of the NiAl coating. Since RuAl has a melting point considerably above the NiAl coating, it is expected that diffusion rates will be decreased through the RuAl and that this phase will be metastable for a substantial time, provided that the diffusion barrier layer is sufficiently thick.

RuZr and RuHf are expected to experience dissolution by interdiffusion which will occur slowly both toward the NiAl coating and toward the nickel-based superalloy substrate. Dissolution through these ruthenium alloy species is expected to be slower than diffusion through RuAl since both Hf and Zr have low solubilities with NiAl. In these cases, Huesler phases may develop at the NiAl-RuX interfaces as $(NiRu)_2AlHf$ or $(Ni, Ru)_2AlZr$ Huesler phases forming on the Ni sublattice. Dissolution of RuHf or RuZr on the superalloy side may result in a new phase being formed, since there is very little solubility of either Hf or Zr in either γ or γ'.

Alloys that satisfy the RuX structure, where X=Al, Zr or Hf and having a B2 structure are provided as alloys DB5–7 in Table 1.

EXAMPLE 7

A sample was prepared in accordance with Examples 2 through 6 above using Rene N5 and NiAl aluminide with a diffusion barrier layer. The composition of the diffusion barrier layer is given in Table I as alloy DB5. After thermal cycling as set forth in Example 2, aluminum measurements were made across the N5/DB5/NiAl interface using a microprobe. The percentage aluminum at the interface of the diffusion barrier and the NiAl was about 27% wt. aluminum. The relative thickness loss due to aluminum diffusion from the NiAl for the sample using DB5 as a diffusion barrier layer was 33%–55% as compared to the base line Example 1.

Yet another class of alloys satisfying the requirement for the diffusion barrier layer are alloys having a narrow stoichiometric range and a high melting temperature such as intermetallic phase barrier layers. These alloys are expected to have reduced interdiffusion between the NiAl coating and the superalloy substrate. Alloys of this type include DB12, DB13, DB14, DB18 and DB23 in Table 1. The commonality in each of these alloys is that they have a narrow stoichiometry and have refractory compositions that have high melting temperatures.

DB12, the intermetallic $Cr_2Ta$, is comprised of two elements, both of which have restricted solubility in NiAl. However, both of these elements can dissolve into the superalloy substrate or can react with the substrate or the coating to form other phases, which may also inhibit diffusion.

DB13, $Ni_4W$, is a refractory phase that is expected to dissolve slowly as well as to lower the diffusivities in both the adjacent NiAl coating and in the nickel-based superalloy. DB14, $Co_3W$, and DB18, $Ni_5(Y,Al)$, are similar to DB13 in that they are refractory alloys, that are also expected to dissolve slowly in the adjacent NiAl.

DB23 is a TCP phase. Because this composition is stoichiometric and refractory as well as stable with both the coating and the substrate, it should act to slow interdiffusion of the coating with the substrate.

EXAMPLE 8

A sample was prepared in accordance with Examples 2 through 7 above using Rene N5, NiAl aluminide and a diffusion barrier layer. The composition of the diffusion barrier layer is given in Table I as alloy DB14. After thermal cycling as set forth in Example 2, aluminum measurements were made across the N5/DB14/NiAl interface using a microprobe. The percentage aluminum at the interface of the diffusion barrier and the NiAl was about 19% wt. aluminum. The relative thickness loss due to aluminum diffusion from the NiAl for the sample using DB14 as a diffusion barrier was 67%–78% as compared to the base line Example 1.

EXAMPLE 9

A sample was prepared in accordance with Examples 2 through 8 above using Rene N5, NiAl aluminide and a diffusion barrier layer. The composition of the diffusion barrier layer is given in Table 1 as alloy DB23. After thermal cycling as set forth in Example 2, the percentage aluminum measurements were made across the N5/DB23/NiAl interface using a microprobe. The percentage aluminum at the interface of the diffusion barrier and the NiAl was about 27% wt. aluminum. The relative thickness loss due to aluminum diffusion from the NiAl for the sample using DB14 as a diffusion barrier was 41% as compared to the base line Example 1.

The final class of alloys includes diffusion barrier layers that are rich in Re. Pure Re, provided in Table 1 as DB24, has a HCP structure. Diffusion barrier alloys that are Re-based are expected to have excellent diffusion barrier characteristics with the advantages of alloying, such as solid solution strengthening. These alloys will have slightly lower melting points than pure Re, but since Re has a high melting point, this slight reduction provides a processing advantage. These alloys include at least one element selected from the group including Al, Pt, and Cr and combinations thereof, these elements present in an amount sufficient to provide solid solution strengthening while maintaining the HCP structure of the Re base material.

DB25, having 20 a/o Re is near the solubility limit for Re in nickel solid solutions, but will have a higher melting point and a lower diffusivity. However, it may have high Al solubility, but will restrict diffusion of elements from the substrate into the NiAl coating. DB26 includes Re near its solubility limit in Cr and has a BCC solid solution structure. It will have a very high melting point and will have limited solubility with the NiAl coating. On the superalloy side, the Cr-Re solid solution may act to promote TCP phase formation through interdiffusion. DB27 is a ReAl composition that should be stable because of its high melting temperature and narrow stoichiometry. It should have low solubility in NiAl, but may suffer from slow dissolution of Re into the superalloy. However, this should occur gradually and over a long period of time so it should be an effective diffusion barrier layer. DB28 is a hexagonal solid solution of Re and Pt that has a very high melting temperature. The preferred compositions include Re in atomic % from 10%–60% and balance Pt and incidental impurities.

EXAMPLE 10

A sample was prepared in accordance with Examples 2 through 9 above using Rene N5 NiAl aluminide and a diffusion barrier layer. The composition of the diffusion barrier layer is given in Table 1 as alloy DB24. After thermal cycling as set forth in Example 2, aluminum measurements were made across the N5/DB24 NiAl interface using a microprobe. The percentage aluminum at the interface of the diffusion barrier and the NiAl was about 32%. aluminum. The relative thickness loss due to aluminum diffusion from the NiAl for the sample using DB24 as a diffusion barrier was near zero, compared to the base line Example 1.

FIG. 6 depicts the effects of a diffusion barrier on the wall thickness of a sample. FIG. 6(a) and 6(b) represent the sample without a diffusion barrier before and after engine service, while FIG. 6(c) and 6(d) represent the samples having the diffusion barriers of the present invention. In FIG. 6b, diffusion layer after service has a much higher aluminum concentration than the Al concentration in the N5 substrate at the interface as shown in FIG. 6A. As can be seen, a diffusion barrier layer that is effective should minimize the formation of a diffusion layer in a NiAl/superalloy system by slowing or stopping the migration of Al away from the NiAl coating. This is effectively shown in FIG. 6d after engine service wherein the diffusion zone 20 of a sample, shown in FIG. 6c prior to service, that includes the diffusion barrier 33 of the present invention is much smaller than the diffusion zone of a sample not including such a barrier as shown in FIG. 6b after the same time exposures at temperature.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. An article for use in a high temperature oxidative environment, comprising:
   a nickel-base superalloy substrate;
   a tightly adherent diffusion barrier layer overlying the substrate that is thermodynamically and kinetically stable in the high temperature oxidative environment comprised of an alloy selected from the group consisting of metallic solid solutions and intermetallics having a low diffusion permeability of aluminum; and
   a coating having a high concentration of aluminum overlying the diffusion barrier layer wherein the concentration of aluminum in the coating is greater than the concentration of aluminum in the superalloy substrate.

2. The article of claim 1 further including a ceramic topcoat overlying the coating having a high concentration of aluminum.

3. The article of claim 1 wherein the tightly adherent diffusion barrier layer has a low diffusion permeability for at least one element selected from the group consisting of Cr, W, Ta, Mo, Re, Ti and Co.

4. An airfoil for use in a gas turbine engine, comprising:
   a nickel-based superalloy substrate;
   a tightly adherent single phase metallic solid solution diffusion barrier layer including sufficient Ru to elevate the melting temperature of the layer above the melting temperature of the substrate and at least one element selected from the group consisting of Ni, Co, and Cr and combinations thereof; and
   a coating having a high concentration of Al wherein the concentration of Al in the coating is greater than the concentration of Al in the superalloy substrate, the coating selected from the group consisting of MCrAlY (X), PtAl and NiAl.

5. The airfoil of claim 4 further including a ceramic topcoat of yttria-stabilized zirconia.

6. The airfoil of claim 4 wherein the Ru containing single phase metallic solid solution alloy has a hexagonal crystal structure and a composition in atomic percent of about 15–35% Ru, up to about 10% Cr and the balance Co and incidental impurities.

7. The airfoil of claim 6 wherein the Ru-containing single phase metallic solid solution alloy has a composition of about 30% Ru, about 5% Cr and the balance Co and incidental impurities.

8. The airfoil of claim 4 wherein the Ru-containing single phase metallic solid solution alloy has a fcc crystal structure and a composition in atomic percent of about 5–20% Ru and the balance Ni and incidental impurities.

9. The airfoil of claim 8 wherein the metallic solid solution alloy has a composition of about 20% Ru and the balance Ni and incidental impurities.

10. The airfoil of claim 4 wherein the Ru-containing single phase solid solution alloy has a hexagonal crystal structure and a composition in atomic percent of at least 80% Ru and the balance Ni and incidental impurities.

11. The airfoil of claim 4 wherein the metallic solid solution alloy is comprised of, in weight percent, about 30% Ru, about 5% Cr, and the balance Co and incidental impurities.

12. The airfoil of claim 10 wherein the metallic solid solution alloy has a composition of about 80% Ru and the balance Ni and incidental impurities.

13. The airfoil of claim 4 wherein the Ru-containing single phase metallic solid solution alloy has a bcc crystal structure and a composition in atomic percent of about 10–20% Ru and the balance Cr and incidental impurities.

14. The airfoil of claim 13 wherein the metallic solid solution alloy has a composition of about 15% Ru and the balance Cr and incidental impurities.

15. An airfoil for use in a gas turbine engine, comprising:
   a nickel-based superalloy substrate;
   a tightly adherent single phase intermetallic alloy diffusion barrier layer having an $L1_2$ lattice structure and having a composition, in atomic percent, of from about 12% to about 21% Al and at least one element selected from the group consisting of Ta, W and B so that the total amount of Al and elements from the group consisting of Ta and W and combinations thereof totals about 23–27%, optionally B from about 10–500 ppm, and the balance Ni and incidental impurities; and
   a coating having a high concentration of Al wherein the concentration of Al in the coating is greater than the concentration of Al in the superalloy substrate, the coating selected from the group consisting of MCrAlY (X), PtAl and NiAl.

16. The airfoil of claim 15 further including a ceramic topcoat of yttria-stabilized zirconia.

17. The airfoil of claim 15 wherein the tightly adherent single phase intermetallic alloy diffusion barrier layer having an $L1_2$ lattice structure has a composition, in atomic percent, of from about 12% to about 18% Al and a total amount of Al+Ta of about 23–27% and the balance Ni and incidental impurities.

18. The airfoil composition of claim 15 wherein the tightly adherent single phase intermetallic alloy diffusion barrier layer further includes about 10–500 ppm B.

19. The airfoil of claim 15 wherein the tightly adherent single phase intermetallic alloy diffusion barrier layer having an $L1_2$ lattice structure has a composition, in atomic percent, of 15% Al and a 9% Ta and the balance Ni and incidental impurities.

20. The airfoil of claim 19 wherein the tightly adherent single phase intermetallic alloy diffusion barrier layer further includes about 10–500 ppm B.

21. The airfoil of claim 15 wherein the tightly adherent single phase intermetallic diffusion barrier layer having an $L1_2$ lattice structure has a composition, in atomic percent, of from about 17% to about 23% Al and a total amount of Al+W of about 23–27% and the balance Ni and incidental impurities.

22. The airfoil of claim 21 wherein the layer further includes about 10–500 ppm B.

23. The airfoil of claim 21 wherein the tightly adherent single phase intermetallic diffusion barrier layer having an $L1_2$ lattice structure has a composition, in atomic percent, of 20% Al, about 6% W and the balance Ni and incidental impurities.

24. An airfoil for use in a gas turbine engine, comprising:
a nickel-based superalloy substrate;
a tightly adherent single phase intermetallic alloy diffusion barrier layer of the form $M_3X$ where M is an element selected from the group consisting of Ni, Co and Pt and X is at least two elements selected from the group consisting of Ta, Nb, Cr and Al, at least one of the two X elements selected from the group consisting of Ta and Nb and having a composition, in atomic percent, of from about 22% to about 25% and at least one of the two X elements selected from the group consisting of Al and Cr and having a composition of from about 1% to about 5% so that the total amount of Ta+Nb+Al+Cr is from about 23–30%, and the balance M and incidental impurities; and
a coating having a high concentration of Al wherein the concentration of Al in the coating is greater than the concentration of Al in the superalloy substrate, the coating selected from the group consisting of MCrAlY (X), PtAl and NiAl.

25. The airfoil of claim 24 further including a ceramic topcoat of yttria-stabilized zirconia.

26. The airfoil of claim 24 wherein the tightly adherent single phase intermetallic alloy diffusion barrier layer of the form $M_3X$ has a composition of about 24% Ta, about 3% Cr, about 1% Al and the balance Ni and incidental impurities.

27. The airfoil of claim 24 wherein the tightly adherent single phase intermetallic alloy diffusion barrier layer of the form $M_3X$ has a composition of about 24% Ta, about 3% Cr, about 1% Al and the balance Co and incidental impurities.

28. The airfoil of claim 24 wherein the tightly adherent single phase intermetallic alloy diffusion barrier layer of the form $M_3X$ has a composition of about 24% Nb, about 3% Cr, about 1% Al and the balance Ni and incidental impurities.

29. The airfoil of claim 24 wherein the tightly adherent single phase intermetallic alloy diffusion barrier layer of the form $M_3X$ has a composition of about 24% Ta, about 3% Cr, about 1% Al and the balance Pt and incidental impurities.

30. An airfoil for use in a gas turbine engine, comprising:
a nickel-based superalloy substrate;
a tightly adherent single phase intermetallic alloy diffusion barrier layer of the form $M_2AlX$ where M is an element selected from the group consisting of Ni and Co and optionally in atomic percent up to a maximum of 5% Cr, so that the total amount of Ni+Co+Cr is about 50% and X is at least one element selected from the group consisting of Ta, Hf and Nb, and incidental impurities; and
a coating having a high concentration of Al wherein the concentration of Al in the coating is greater than the concentration of Al in the superalloy substrate, the coating selected from the group consisting of MCrAlY (X), PtAl and NiAl.

31. The airfoil of claim 30 further including a ceramic topcoat of yttria-stabilized zirconia.

32. The airfoil of claim 30 wherein the tightly adherent single phase intermetallic alloy diffusion barrier layer of the form $M_2AlX$ has a composition of about 45% Ni, about 5% Cr, about 25% Al, about 25% Ta and incidental impurities.

33. The airfoil of claim 30 wherein the tightly adherent single phase intermetallic alloy diffusion barrier layer of the form $M_2AlX$ has a composition of about 45% Ni, about 5% Cr, about 25% Al, about 25% Nb and incidental impurities.

34. The airfoil of claim 30 wherein the tightly adherent single phase intermetallic alloy diffusion barrier layer of the form $M_2AlX$ has a composition of about 45% Co, about 5% Cr, about 25% Al, about 25% Ta and incidental impurities.

35. The airfoil of claim 30 wherein the tightly adherent single phase intermetallic alloy diffusion barrier layer of the form $M_2AlX$ has a composition of about 45% Ni, about 5% Cr, about 25% Al, about 25% Hf and incidental impurities.

36. An airfoil for use in a gas turbine engine, comprising:
a nickel-based superalloy substrate;
a tightly adherent single phase intermetallic alloy diffusion barrier layer having a B2 lattice structure of the form RuX where X is an element selected from the group consisting of Al, Zr and Hf, and incidental impurities; and
a coating having a high concentration of Al wherein the concentration of Al in the coating is greater than the concentration of Al in the superalloy substrate, the coating selected from the group consisting of MCrAlY (X), PtAl and NiAl.

37. The airfoil of claim 36 further including a ceramic topcoat of yttria-stabilized zirconia.

38. The airfoil of claim 36 wherein the tightly adherent single phase intermetallic alloy diffusion barrier layer having a B2 lattice structure of the form RuX has a composition in atomic percent of about 48% Ru, about 50% Al and incidental impurities.

39. The airfoil of claim 36 wherein the tightly adherent single phase intermetallic alloy diffusion barrier layer having a B2 lattice structure of the form RuX has a composition in atomic percent of about 50% Ru, about 50% Zr and incidental impurities.

40. The airfoil of claim 36 wherein the tightly adherent single phase intermetallic alloy diffusion barrier layer having a B2 lattice structure of the form RuX has a composition in atomic percent of about 50% Ru, about 50% Hf and incidental impurities.

41. An airfoil for use in a gas turbine engine, comprising:
a nickel-based superalloy substrate;
a tightly adherent, as-deposited, single phase, intermetallic alloy diffusion barrier layer having a capability of transforming, as a result of diffusion, into two phases, the layer further characterized by a refractory composition with a melting temperature at least as high as that of the substrate; and
a coating having a high concentration of Al wherein the concentration of Al in the coating is greater than the concentration of Al in the superalloy substrate, the coating selected from the group consisting of MCrAlY (X), PtAl and NiAl, with reduced interdiffusion between the coating and the substrate through the intermetallic alloy.

42. The airfoil of claim 41 further including a ceramic topcoat of yttria-stabilized zirconia.

43. The airfoil of claim 41 wherein the tightly adherent intermetallic alloy includes, in atomic percent, at least 20% of at least one refractory element selected from the group consisting of Cr, Mo, Ta, and W and combinations thereof, and at least one element selected from the group consisting of Ni and Co and combinations thereof, the total amount of the refractory elements and the Ni and Co being at least about 65% and optionally the balance Re and incidental impurities.

44. The airfoil of claim 43 wherein the tightly adherent intermetallic alloy is $Ni_4W$ having a composition, in atomic percent, of about 20% W and the balance Ni and incidental impurities.

45. The airfoil of claim 43 wherein the tightly adherent intermetallic alloy is $Co_3W$ having composition, in atomic percent, of about 25% W and the balance Co and incidental impurities.

46. The airfoil of claim 43 wherein the tightly adherent intermetallic alloy includes, in atomic percent, about 15% W, about 22% Ni, about 17% Co, about 5% Cr, about 1% Ta, about 5% Mo and the balance Re and incidental impurities.

47. The airfoil of claim 41 wherein the tightly adherent intermetallic alloy includes, in atomic percent, is $Cr_2Ta$ having a composition of about 33% Ta and the balance Cr and incidental impurities.

48. An airfoil for use in a gas turbine engine, comprising:
a nickel-based superalloy substrate;
a tightly adherent as-deposited intermetallic alloy diffusion barrier layer, the layer further characterized by a refractory composition with a melting temperature at least as high as that of the substrate, the alloy being a $Ni_5(Al,Y)$ phase and having a composition, in atomic percent, of about 13% Al, about 17% Y and the balance Ni and incidental impurities; and
a coating having a high concentration of Al wherein the concentration of Al in the coating is greater than the concentration of Al in the superalloy substrate, the coating selected from the group consisting of MCrAlY (X), PtAl and NiAl, with reduced interdiffusion between the coating and the substrate through the intermetallic alloy.

49. The airfoil of claim 48 further including a ceramic topcoat of yttria-stabilized zirconia.

50. An airfoil for use in a gas turbine engine, comprising:
a nickel-based superalloy substrate;
a tightly adherent Re-containing alloy diffusion barrier layer characterized by a melting temperature above that of the substrate; and a coating having a high concentration of Al wherein the concentration of Al in the coating is greater than the concentration of Al in the superalloy substrate, the coating selected from the group consisting of MCrAlY(X), PtAl and NiAl, with reduced interdiffusion between the coating and the substrate through the alloy.

51. The airfoil of claim 50 further including a ceramic topcoat of yttria-stabilized zirconia.

52. The airfoil of claim 50 wherein the tightly adherent Re-containing alloy diffusion barrier layer characterized by a melting temperature above that of the substrate is comprised of, in atomic percent, at least about 20% Re and the balance of at least one element selected from the group consisting of Ni, Cr, Co, Al and Pt, and incidental impurities.

53. The airfoil of claim 50 wherein the tightly adherent Re-containing alloy diffusion barrier layer characterized by a melting temperature above that of the substrate has a composition, in atomic percent, of about 20% Re and the balance Ni and incidental impurities.

54. The airfoil of claim 50 wherein the tightly adherent Re-containing alloy diffusion barrier layer characterized by a melting temperature above that of the substrate has a composition, in atomic percent, of about 35% Re and the balance Cr and incidental impurities.

55. The airfoil of claim 50 wherein the tightly adherent Re-containing alloy diffusion barrier layer characterized by a melting temperature above that of the substrate has a composition, in atomic percent, of about 50% Re and the balance Al and incidental impurities.

56. The airfoil of claim 50 wherein the tightly adherent Re-containing alloy diffusion barrier layer characterized by a melting temperature above that of the substrate has a composition, in atomic percent, of about 40% Pt and the balance Re and incidental impurities.

57. The airfoil of claim 50 wherein the tightly adherent Re-containing alloy diffusion barrier layer characterized by a melting temperature above that of the substrate has a composition in which Re is the base material and which includes at least one element selected from the group consisting of Al, Pt, and Cr and combinations thereof, these elements present in an amount sufficient to provide solid solution strengthening while maintaining the HCP structure of the Re base material.

* * * * *